United States Patent Office 3,557,250
Patented Jan. 19, 1971

3,557,250
POLYVINYL ALCOHOL COMPOSITION
Kiyokazu Imai and Takuji Okaya, Kurashiki, Japan, assignors to Kurashiki Rayon Co., Ltd., Kurashiki, Japan, a corporation of Japan
No Drawing. Filed July 24, 1967, Ser. No. 655,329
Claims priority, application Japan, Aug. 5, 1966, 41/51,600; Oct. 11, 1966, 41/66,802
Int. Cl. C08f 29/26
U.S. Cl. 260—874                                                          7 Claims

ABSTRACT OF THE DISCLOSURE

A composition or shaped article consisting of 0.1–80% by weight of polyvinyl alcohol having as a terminal group a higher saturated aliphatic hydrocarbon derivative residual group and 99.9–20% by weight of normal polyvinyl alcohol.

---

The present invention relates to a polyvinyl alcohol composition adapted and arranged for easy preparation of shaped articles having improved water repellency and abrasion resistance.

Polyvinyl alcohol is important as a water-soluble polymer, a film obtained therefrom has excellent properties such as resistance to gas permeation and transparency, and a fiber obtained therefrom is broadly used for clothing and industrial purposes because of its high tenacity. However, owing to the original hydrophilic property of polyvinyl alcohol, there is dissatisfaction concerning surface properties and capacities under wet condition of shaped articles thereof or affinity with non-polar substances. For instance, capacity of polyvinyl alcohol fiber lowers when it is wetted and capacity of its monofilament, especially tenacity, has not been sufficiently utilized in the form of yarn, cord and twisted yarn. A polyvinyl alcohol film has shortcomings that its surface is difficult to slide, films are apt to be adhered to each other when wetted highly and the water vapor permeability is large.

In order to improve properties of polyvinyl alcohol, it has been tried to introduce a monomer having a hydrophobic group such as lauryl vinylether into the main chain by copolymerization. However, crystallization of polyvinyl alcohol is so intensively hindered by the introduction of such a heterogeneous monomer that water resistance of the shaped articles lowers. For instance, even when only 0.2 mol percent of a heterogeneous monomer exists in a vinyl alcohol chain, crystallization of a film obtained therefrom is difficult to proceed. Accordingly, introduction of a heterogeneous monomer into the polyvinyl alcohol main chain is not preferable. On the other hand, as another process for improving properties of polyvinyl alcohol, blending thereof with a non-polar substance such as low molecular weight polyethylene is conceivable. However, not only there is no proper blending process, but also the two have no compatibility, therefore, the desired object cannot be achieved. And it is also proposed that polyethylene emulsion or a surface active agent is applied to the surface of polyvinyl alcohol shaped articles, but these substances simply part from polyvinyl alcohol because of their poor affinity, therefor it can not be practical.

The present inventors have found that a composition consisting of a polyvinyl alcohol to whose one end a saturated aliphatic hydrocarbon chain is introduced and normal polyvinyl alcohol does not have such shortcomings as mentioned above, yet it is imparted with special properties which have been heretofore required of polyvinyl alcohol, however, unable to impart. The composition of the present invention has surprising properties that various preferable properties possessed inherently by polyvinyl alcohol are not lost at all, in addition, further excellent various properties are added. Concerning these excellent properties, detailed explanations will be made later.

Polyvinyl alcohol to whose one end a saturated aliphatic hydrocarbon chain is introduced as referred to in the present invention concretely means a block polymer wherein carbon at $\alpha$-position of a higher saturated aliphatic derivative or sulfur links by covalent bond to the terminal carbon of polyvinyl alcohol. The above higher saturated aliphatic derivative includes higher primary alcohol, higher fatty acid, an ester and a salt thereof, higher fatty acid amide, higher alkyl halide and higher aliphatic mercaptan.

In this specification, polyvinyl alcohol and a derivative thereof are abbreviated as "PVA," and said polyvinyl alcohol to whose one end a saturated aliphatic hydrocarbon chain is introduced may be abbreviated as "block PVA."

The block PVA in the present invention may be prepared by polymerizing a sufficiently purified vinyl ester such as vinyl acetate in the presence of said higher saturated aliphatic derivative using a radical initiator in an inert atmosphere, and saponifying the obtained polyvinyl ester having saturated aliphatic hydrocarbon chain at its end. Polymerization is often carried out in a solvent which is relatively unlikely to chain transfer such as methanol and tertiary butanol. Saponification does not require any particular process, but a heretofore carried out process for saponifying polyvinyl ester is applicable per se. For instance, it is carried out by an alkali-methanol, an alkali-methanol-water and an acid-methanol. It is considered that the reaction, when, for instance, a higher primary alcohol is used as a higher saturated aliphatic derivative, proceeds as shown in the following Formulae 1–4. In the formulae, R stands for a saturated aliphatic hydrocarbon group and Q· stands for a radical initiator.

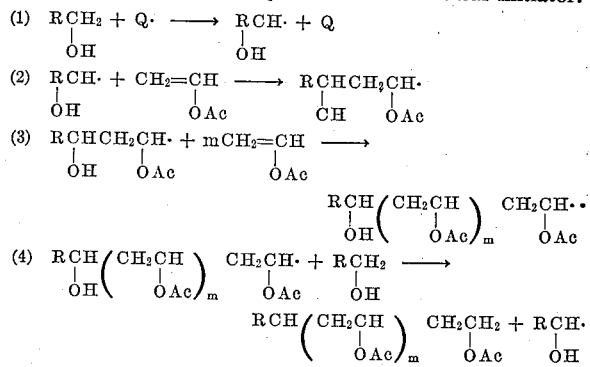

When the obtained block polyvinyl acetate is saponified, block PVA is obtained as shown in the following formula.

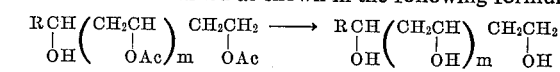

The aforementioned higher saturated aliphatic derivatives used for preparing block PVA in the present invention are represented by the following general formula.

R—CH₂—Y wherein R is a saturated aliphatic hydrocarbon group, Y is —OH when said derivative is a higher primary alcohol, —COOR' (wherein R' is hydrogen, an alkyl group having 1–3 carbon atoms, sodium or potassium) when said derivative is a higher fatty acid, an ester and a salt thereof, —CONH$_2$ when said derivative is a higher fatty acid amide, F, Cl, Br or I when said derivative is a higher alkyl halide and —SH when said derivative is a higher aliphatic mercaptan.

Block PVA's obtained by polymerizing vinyl acetate in the presence of said higher aliphatic derivatives and by saponifying the obtained polymer have the following structures, respectively.

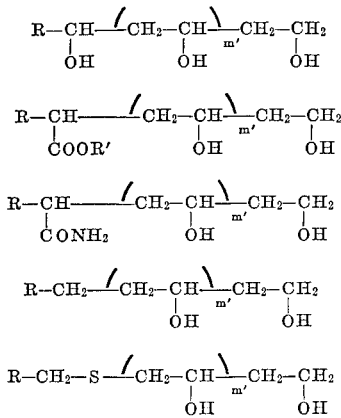

In the above formulae

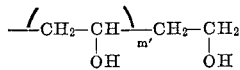

is a polyvinyl alcohol chain.

In said block PVA's, in order to improve water repellency and abrasion resistance, R constituting an aliphatic hydrocarbon chain must have at least 5 carbon atoms. When the number of carbon atoms possessed by R is too large, troubles such as solubility of higher saturated aliphatic derivatives to vinyl acetate lowers at the time of polymerizing vinyl acetate and precipitation of the produced polymer becomes intense are brought about and water-solubility of the obtained block PVA becomes poor, therefore, number of carbon atoms must be maximum 29. Preferable number of carbon atoms of R is 9–23, and most preferably 11–17. An aliphatic hydrocarbon chain of R means a saturated hydrocarbon failing to form a ring, however, it may have an alkyl branched group such as methyl group, ethyl group and propyl group. A higher primary alcohol such as n-hexyl alcohol, n-heptyl alcohol, n-octyl alcohol, 2-ethyl hexyl alcohol, decyl alcohol, lauryl alcohol, tetradecyl alcohol, cetyl alcohol, stearyl alcohol, eicosanol and 2-octanol; a higher fatty acid such as capric acid, myristic acid, palmitic acid and stearic acid; a sodium salt, a potassium salt, a lower alkyl ester and an amide of these higher fatty acids; a higher mercaptan such as octyl mercaptan, dodecyl mercaptan and octadecyl mercaptan; and a higher alkyl alide such as dodecyl chloride, hexadecyl chloride and octadecyl chloride may be used.

As a result of variably examining properties of the composition consisting of block PVA having an aliphatic hydrocarbon chain at its one end and normal PVA as mentioned above, the present inventors have found that shaped articles obtained from said composition are remarkably improved of its surface properties which become water-repellent, viz. lipophilic. Moreover, the preferable properties inherently possessed by PVA are not damaged wherein lies an important characteristic of this invention. Though it appears to contradict the fact that the surface becomes water-repellent, it is a phenomenon easily understandable from the fact that the aliphatic hydrocarbon chain at one end does not obstruct crystallization of the vinyl alcohol portion and said hydrocarbon exists on the surface of a shaped article or in a non-crystalline area thereof.

Block PVA in the present invention should have polymerization degree of at least 150 preferably at least 400. Polymerization degree of block PVA as referred to in the present invention means polymerization degree of the polyvinyl alcohol portion in the molecule. The upper limit of the polymerization degree is preferably below 3000. When the polymerization degree of block PVA is below 150, solubility to water lowers and a composition consisting of such block PVA and normal PVA not only lowers in water-solubility, but also block PVA becomes apt to separate. As a result, the aforementioned effect cannot be expected. Saponification degree of block PVA is preferably at least 95 mol percent.

Normally PVA mixed with block PVA in the present invention means a polymer consisting of at least 95% of the structural unit

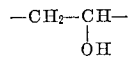

For example, saponified products of polyvinyl esters derived from, for instance, vinyl acetate, vinyl formate and vinyl trifluoro acetate, and acid hydrolyzed products of polyvinyl ether derived from benzyl vinyl ether and t-butyl vinyl ether may be mentioned. PVA is also obtained by treating vinyl silyl ethers with, for instance, methanol. Polymerization degree of normal PVA is preferably 500–5000. In the composition of the present invention, content of higher saturated aliphatic derivative residual group can be in a very broad range. However, when the content is too little, an effect of imparting water-repellency to the surface of a shaped article is lessened and an effect for internal plasticization disappears. Therefore, it is necessary that the content is at least 0.001% by weight, preferably at least 0.005% by weight. The upper limit thereof is about 6% by weight. It is possible that the content becomes higher than that, however, since in that case water-solubility of the composition is apt to lower to some extent, it is not preferable.

In order to let the content of a higher unsaturated aliphatic derivative residual group in the aforementioned range, it is possible to decide ratio of block PVA to be mixed with normal PVA as follows.

When in a higher saturated aliphatic hydrocarbon derivative of R—CH$_2$—Y [ wherein R is a saturated aliphatic hydrocarbon group having 5–29 carbon atoms, Y is selected from the group consisting of —OH, —COOR' (wherein R' is hydrogen, an alkyl group having 1–3 carbon atoms, sodium or potassium), —CONH$_2$, a halogen atom and —SH], number of carbon atoms of R is made $n$ (5–29), sum of atomic weights of atoms constituting Y is made $x$ (however, calculation is so made that when Y is a halogen atom, $x=1$), polymerization degree of block PVA is made $m$ (150–3000) and mixing ratio of block PVA to normal PVA is made ($a$) percent, the weight ratio (percent) of a higher aliphatic derivative residual group in the composition is represented by the formula:

$$\frac{14(n+1)+x}{44m+14(n+1)+x} \times (a)$$

Accordingly, when ($a$) is so selected that the value of said formula becomes 0.001–6, it is possible to decide the mixing ratio of block PVA.

In accordance with said formula, it is understood that ($a$) is variable in a very broad range, however, properties of the obtained composition or shaped article does not change so much according to the amount of ($a$). Namely, the composition of the present invention has unique properties that even when an amount of block PVA contained therein is very small, the obtained shaped article is remarkably modified, yet degree of said modification hardly changes even when content of block PVA increases. One example is shown below as for a contact angle to water of a film prepared from a composition consisting of block PVA having a stearyl alcohol group at one end and normal PVA. As will be understood from the following table, the contact angles do not differ much within the range of effective content of block PVA.

| Content of block PVA having a stearyl alcohol group percent by wt.: | Contact angle to water (°) |
|---|---|
| 0 | 45 |
| 0.5 | 71 |
| 1.0 | 80 |
| 3.0 | 83 |
| 5.0 | 85 |
| 10.0 | 85 |
| 20.0 | 87 |
| 30.0 | 86 |
| 65.0 | 90 |
| 70.0 | 88 |

Generally, however, it is preferable that said (a) is within the range of 0.1–80, and in the sense a shaped article is easy to be produced from an aqueous solution of the composition, the range of 0.5–40 is most preferable.

The composition containing block PVA in the range of 0.1–80% becomes an ideal PVA composition retaining the inherent properties of PVA, having the features that it has very good water-solubility, the interior thereof is plasticized and the surface of shaped articles prepared therefrom is water-repellent.

As mentioned above, block PVA having at its one end a higher saturated aliphatic derivative residual group in the present invention is produced by polymerizing purified vinyl ester in the presence of a higher saturated aliphatic derivative and saponifying the resulting polymer. Said polymerization inevitably involves, at the same time, the formation of polyvinyl ester without higher saturated aliphatic group at one end, though the amount of formation of said polymer depends on the polymerization condition. Accordingly, a mixture of block PVA and normal PVA is obtained by the saponification of polymerization product. The composition of the present invention also includes the so produced mixture. It is possible to isolate block PVA from such mixture and blend the same with another PVA to obtain the composition of the present invention. However, generally complexity of such isolation operation is avoided and said mixture per se is blended with another PVA. Blending may be carried out by whatever process. Namely, blending may be carried out in solid state or solution state. It may be that one is a solution and the other is in solid state, and the two in whatever states may be blended. Production of shaped articles is generally carried out by removing water from an aqueous solution of the composition. As concentration of such an aqueous solution, 3–50% is especially advantageous.

Since a part of the terminal hydrocarbon chain contained in the composition of the invention comes out selectively on the surface through the shaping process, the surface of the obtained shaped article is remarkably modified.

Next, features of shaped articles derived from the composition of the present invention will be explained while referring to a film and a fiber as examples.

A film produced from the composition of the present invention consisting of normal PVA and block PVA has the following features:

(1) The surface of the film is easy to slide.
(2) The films do not adhere to each other.
(3) The film has water repellency.
(4) Stripping of the film from the drum during the shaping process is easy.

Generally, PVA film is produced by drying an aqueous solution of PVA on a drum, but stripping the film from the drum is difficult. It is once industrially solved by adding a surface active agent to the solution. However, even the strictly selected surface active agent is not free from frequent hindrance of adhering to the surface of the drum or blocking the nozzle tip during continuous operations for a long time.

Whereas, in the production of a film from the composition of the present invention even if a surface active agent is not added, stripping of the film from the drum is easy and the process is simple as compared with the production of film from the PVA solution added with a surface active agent. Accordingly, all the difficulties caused by addition of a surface active agent are eliminated. This effect is achieved by incorporation of block PVA, moreover block PVA per se is easily crystallized by heat, so that crystallization of the obtained film by heat treatment is not obstructed. This is one of the important features of the present invention.

Since PVA film is easy to get wet, water drops on its surface make it swell and cause it to crease. On the contrary a film derived from the composiiton of the present invention is difficult to get wet because of its water-repellency, so that it is unlikely to crease. This is properties having been required of the conventional PVA film, yet has not been achieved.

The aforementioned various effects are considered to be caused due mainly to a part of the aliphatic hydrocarbon chain bonded to the end of PVA coming out on the surface of the film. Accordingly, as model of the film according to the present invention, conventional PVA film applied with paraffin to its surface can be assumed, however, different from merely applying, paraffin chemically bonds to the film substrate and will not part from the film, in which respect it is different from the conventional film.

A film may be produced by whatever process, however, a process of evaporating water from the aqueous solution is most advantageous. In the aqueous solution a substance other than PVA such as a lower molecular weight polyhydric alcohol plasticizer like glycerol may be contained. Film is produced by evaporating water in the air on the surface of metal, glass or plastic, thereafter the film is heat treated at a temperature above 100° C. Crystallinity of the film is not affected by the existence of block PVA. The obtained film is advantageous as mentioned above and is a very excellent film whose transparency, tear strength, tenacity, tensile strength, elongation and Young's modulus are not different at all from a normal PVA film.

A fiber produced from the composition of the present invention consisting of block PVA and normal PVA has the following features.

(1) The fiber has water-repellency.
(2) The fiber is remarkably low in friction coefficient and remarkably advanced in friction strength.
(3) Efficiency of strength of a spun yarn and a multifilament yarn is advanced.
(4) Ratio of wet knot strength to the tensile strength of a monofilament and ratio of dry and wet knot strengths to the tensile strength of a spun yarn and a multifilament yarn are advanced.
(5) Treatment of the fiber with an oiling agent can be omitted.
(6) Shrinkage in high temperature water of the fiber is lowered.
(7) The fiber is excellent in spinnability.
(8) Agglutination between the fiber and the spinneret at the time of spinning is improved.
(9) The fiber is transparent.
(10) Fluffing due to cutting of a single yarn at the time of drawing is remarkably decreased.
(11) The fiber has little occurrence of static electricity due to friction.

The aliphatic hydrocarbon chain bonded to one end of block PVA selectively comes out on the surface during the process of gelation of the spinning solution in the coagulating bath or in the air and accordingly the fiber thus obtained is water-repellent and is covered with hydrocarbon having little friction. As a result, the fiber becomes unlikely to get wet by water, frictions between the fibers and between the fiber and another substance lower and friction strength advances. Upon twisting together monofilaments, this property that the surface is easy to slide acts advantageously and efficiency of strength is considered in advance. This surface properties affect advantageously the ratio of knot strength to the tensile strength of a spun yarn and a multifilament yarn. As is well known, an oiling agent used for oiling is a surface active agent of which some is nonionic and consists of a hydrophilic part and a hydrophobic part. Because the fiber of the present invention contains polyvinyl alcohol having hydrocarbon chain at one end which is essentially a surface active agent, one of the objects of oiling treatment for imparting lubricity has been achieved already. Polyvinyl alcohol constituting the fiber of the present invention has no heterogeneous linkage in the main chain, so that orientation and crystallization of the polyvinyl alcohol part are not obstructed at all. Therefore, in accordance with the present invention, a fiber imparted with various properties as mentioned above is obtained without damaging excellent tenacity, elongation and Young's modulus possessed by an ordinary polyvinyl alcohol fiber.

A spinning solution is prepared by dissolving the composition of the present invention in water. Said solution can be made fibrous by wet spinning wherein a spinning solution is spun into a coagulating bath and dry spinning wherein a spinning solution is spun into the air. The spinning process is the same as a process adopted in preparation of the conventional PVA fiber. A fiber formed is subsequently subjected to drawing and heat treatment, and further acetalization if necessary.

Because the terminal hydrocarbon group contained in the fiber is chemically bonded to PVA constituting the fiber, the fiber is different from the conventional fiber in that said group is not removed by washing or friction.

The composition of the present invention is useful as a coating agent as well.

Next, the present invention will be illustrated by examples, however, it will not be limited thereby.

EXAMPLE 1

A mixture of 17 cc. of lauryl alcohol, 8 cc. of vinyl acetate and 0.01 g. of azobisisobutyronitrile was maintained at 60° C. in a nitrogen atmosphere for 3 hours thereby lauryl alcohol-block-polyvinyl acetate (namely, a compound wherein lauryl alcohol residual group blocks to one end of polyvinyl acetate), expression of the same type may appear hereinafter was obtained, which was saponified in methanol containing NaOH to obtain PVA containing lauryl alcohol-block-PVA. The polymerization degree thereof measured by viscometry in an aqueous solution at 30° C. was 280. A stable 15% aqueous solution was prepared by mixing 0.5 g. of this PVA with 9.5 g. of a commercially available PVA (saponification degree: 99.9 mol percent, polymerization degree: 1700). The content of lauryl alcohol residual group in the composition was about 0.07% by weight. A film produced from said aqueous solution was advanced in water-repellency and abrasion resistance as compared with a film obtained from pure PVA. The film could be sufficiently heat treated and crystallized thereby.

EXAMPLE 2

A mixture of 8.6 g. of stearic acid, 10 cc. of vinyl acetate and 0.01 g. of azobisisobutyronitrile was treated as in Example 1 to obtain PVA containing stearic acid-block-PVA. The polymerization degree thereof was 1050. A 2% stable aqueous solution was prepared by mixing 0.1 g. of this PVA with 9.9 g. of a commercially available PVA (polymerization degree: 1700). The surface of a film obtained therefrom showed a contact angle 86° to water and was confirmed to have become water-repellent.

EXAMPLE 3

A mixture of 230 g. of stearyl alcohol, 800 cc. of vinyl acetate and 0.16 g. of azobisisobutyronitrile was maintained at 60° C. for 5 hours in a nitrogen atmosphere. The resultant polymer was saponified by a usual manner using an alkali-methanol to obtain about 150 g. of PVA. It was confirmed that the polymerization degree thereof was 1650 and about 65% of stearyl alcohol-block-PVA was contained. 16 g. of said PVA and 144 g. of a commercially available PVA (saponification degree: 99.9 mol percent, polymerization degree: 1,700) were mixed and the mixture (content of block PVA: 6.5%) was dissolved in 1,840 cc. of water. This solution was designated solution A. For the purpose of comparison, 160 g. of the above commercially available PVA alone was dissolved in 1,840 cc. of water into a solution designated solution B and the solution B added with 16 mg. of polyethylene lauryl ether as a surface active agent was designated solution C. Films were prepared by thinly flowing these solutions on a chromium-coated drum heated at 70° C., respectively. One-half of the respective film was heat treated at 180° C. for 10 seconds. Physical properties were measured with respect to both heat treated films and non-heat treated films. The results were shown in Table 1.

TABLE I

| Sample | Film separation from drum | Adhesion resistance [1] | | Water vapor permeability [2] | | Maximum static friction angle [3] | | Contact angle [4] |
| --- | --- | --- | --- | --- | --- | --- | --- | --- |
| | | Non-heat-treated | Heat-treated | Non-heat treated | Heat-treated | Non-heat treated | Heat-treated | |
| A | Very good | Good | Very good | $3.1 \times 10^2$ | $1.8 \times 10^3$ | 67 | 46 | 88 |
| B | Bad | Bad | Somewhat bad | $5.4 \times 10^2$ | $2.8 \times 10^2$ | 86 | 83 | 45 |
| C | Good | Bad | do | $6.0 \times 10^2$ | $2.9 \times 10^2$ | 82 | 79 | 51 |

[1] After maintaining humidity at 90% and temperature at 35° C. for 1 hour, films were overlapped, weight of 0.5 kg./6 cm.² was placed thereon for 10 minutes, thereafter degree of peel strength was judged.
[2] Number of gram of water permeating for 24 hours per unit m.² (converted to thickness of 30μ).
[3] On a film pasted on a plate 20° C. and humidity of 65%, a film was placed, the plate was inclined at a constant angular velocity and it was an angle where the second film began to slide.
[4] Contact angle to water.

From Table 1, it is apparent that a film of PVA containing block PVA (A) is easy to be produced as compared with film not containing block PVA (B, C) and the obtained film is excellent in *adhesion resistance,* water vapor permeability, easiness of sliding and water-repellency.

EXAMPLE 4

PVA containing block PVA (content of block PVA: 65%) obtained in Example 3 was made a film as in Example 3 except the concentration of the aqueous solution of the polymer being made 6%. Properties of the obtained film after heat-treatment were, wet permeability: $1.6 \times 10^2$, maximum static friction angle: 42°, contact angle: 90°, stripping from the drum was very good and no *adhesion* was observed at all.

EXAMPLE 5

A mixture of 1% of PVA containing block PVA with 99% of normal PVA having polymerization degree of 1730 (content of block PVA: 0.65%) was made a 12% aqueous solution, and a film was produced on the surface of a drum coated with polyvinyl butyral at 65° C. Without addition of a surface active agent, the film was stripped well from the drum. Contact angle of the obtained film to water was 74° and as compared with that of a control sample of 47°, it was understood that the surface of the film had become water-repellent. Adhesion between the films did not take place.

EXAMPLE 6

A flask was charged with 670 cc. of vinyl acetate, 330 cc. of lauryl alcohol and 0.25 g. of azobisisobutyronitrile. After the air inside was replaced by nitrogen gas, the contents were heated at 60° C. for 5 hours. The obtained polymer was saponified by a usual manner to obtain PVA having lauryl alcohol residual group at its one end whose saponification degree was 99.8 mol percent. In 880 cc. of water, 20 g. of this polymer, 80 g. of a completely saponified PVA and 20 g. of glycerol were dissolved and a film was produced by evaporating water on a metal plate, then, different from the case of producing a normal PVA film, despite non-existence of a surface active agent, stripping of the film from the metal plate was very easy. From the adhesion test and measuring of the contact angle of the obtained film, it was understood that the film was remarkably different from a normal PVA film, having water-repellency. The mechanical properties such as transparency and tensile strength thereof were not different from those of a normal PVA film, being excellent.

EXAMPLE 7

A mixture of 2400 cc. of vinyl acetate, 700 g. of stearyl alcohol and 0.47 g. of azibisisobutyronitrile was heated at 60° C. for 6 hours in a nitrogen atmosphere. The obtained polymer was saponified by a usual manner to obtain 500 g. of polyvinyl alcohol containing about 70% by weight of stearyl alcohol-block-PVA. The polymerization degree thereof was 1600. Said polyvinyl alcohol was mixed with a commercially available completely saponified polyvinyl alcohol (polymerization degree: 1700) to prepare a 15% aqueous solution as a spinning solution. Using a spinning machine having a spinneret with 100 orifices and a coagulating bath consisting of a first bath of Glauber's salt aqueous solution at 40° C. (420 g./l.) and a second bath of Glauber's salt aqueous solution at 80° C. (250 g./l.), the spinning solution was spun. A third bath was a water washing bath. Wet heat drawing of 300% was carried out, the filaments were dried in air, thereafter heat drawing of 100% was carried out. Properties of the obtained monofilaments were shown in Table 2.

cient and kinetic friction coefficient lower greatly and it is even in the case that the mixing ratio of PVA containing 70% of block PVA to the commercial PVA is 25% (mixing ratio of block PVA: 17.5%). Judging from the fact that extents of these lowerings are almost same as the extents of lowerings in case of treatment with an oiling agent of a certain kind, it turns out that advancement of ratio of dry and wet knot strengths to the tensile strength and efficiency of strength when the monofilament is made a spun yarn moreover, they are lasting effect is expected, refer to Example 8. It is observed that a temperature at which the monofilament shrinks by 10% in water rises due to existence of block PVA and the maximum shrinkage lowers. From these results, it turns out that a polyvinyl alcohol fiber containing polyvinyl alcohol whose one end bonds to a higher alcohol is an improved fiber as compared with the conventional polyvinyl alcohol fiber.

EXAMPLE 8

By the same process as that in Example 7, PVA containing block PVA having stearyl alcohol residual group at one end was synthesized. The polymerization degree was 1700 and the content of the block PVA was about 64% by weight. 20% of this PVA was mixed with 80% of normal PVA, the mixture was spun, drawn and heat treated as in Example 7, thereafter formalization, crimping and cutting were carried out by a usual manner, the cut length was made 40 mm., and a spun yarn was obtained therefrom. Next, said spun yarn was washed repeatedly for three times in an aqueous solution of a commercially available detergent, and finally in water. When said spun yarn was compared with a control PVA spun yarn produced and treated similarly with respect to efficiency of strength, ratio of dry and wet knot strengths to the tensile strength, and wet twist abrasion frequency, advancement in all respects were recognized. Especially, the wet twist abrasion frequency thereof reached as many as five times that of the control thereby it was confirmed that excellent effects possessed by the fiber of the present invention were lasting. Wet twist abrasion frequency was decided by rubbing together the sample yarns wetted with water and frequency until their cutting was measured.

EXAMPLE 9

Polymerization of vinyl acetate was carried out as in Example 7 in the respective presence of cetyl alcohol, lauryl alcohol and n-hexyl alcohol to obtain polyvinyl alcohols containing about 60% by weight of block PVA's having hydrocarbon groups at their one ends of about the same polymerization degrees (1500–1700). 10% of

TABLE 2

| Mixing ratio [1] | Mixing ratio [2] | Denier | Tenacity, g./d. | Elongation, percent | Young's modulus, g./d. | Static friction coefficient | Kinetic friction coefficient | Temperature [3] |
|---|---|---|---|---|---|---|---|---|
| 100 | 0 | 1.3 | 5.6 | 15 | 120 | 0.49 | 0.48 | 67 |
| 75 | 25 | 1.3 | 5.4 | 16 | 109 | 0.39 | 0.35 | 80 |
| 50 | 50 | 1.3 | 5.5 | 16 | 112 | 0.33 | 0.29 | 85 |
| 0 | 100 | 1.3 | 5.8 | 15 | 108 | 0.30 | 0.23 | 88 |

[1] Of commercial PVA, percent.
[2] Of PVA containing block PVA, percent.
[3] At which the filament shrinks by 10% in water, ° C.

From the result of Table 2, judging from the fact that tenacity, elongation and Young's modulus of fibers containing block PVA are about same as those of an ordinary PVA fiber, it is apparent crystallization of the polyvinyl alcohol portion due to heat-treatment is not obstructed at all. On the other hand, static friction coeffieach of these polyvinyl alcohols was mixed with normal polyvinyl alcohol (polymerization degree: about 1800), the mixtures were spun, drawn (the total draw ratio: 700%) and heat-treated as in Example 7, thereafter they were formalized by usual manner. Properties of the obtained monofilaments were shown in Table 3.

TABLE 3

| Terminal group of block PVA | Dry tenacity, g./d. | Dry elongation, percent | Wet tenacity, g./d. | Wet elongation, percent | Kinetic friction coefficient | No. of fluffs |
|---|---|---|---|---|---|---|
| Control | 4.9 | 17 | 4.2 | 18 | 0.50 | Large. |
| n-Hexyl alcohol residual group | 4.9 | 18 | 4.1 | 18 | 0.45 | Medium. |
| Lauryl alcohol residual group | 4.8 | 19 | 4.2 | 20 | 0.39 | Small. |
| Cetyl alcohol residual group | 5.0 | 17 | 4.0 | 18 | 0.37 | Do. |

As shown in Table 3, their dry and wet tenacity and elongation were about same as those of an ordinary polyvinyl alcohol monofilament. Also, their dry and wet Young's modulus, dry elongation elasticity and ratio of dry knot strength were about same as those of an ordinary polyvinyl alcohol monofilament. It turned out that lowering of kinetic friction coefficient as compared with that of an ordinary polyvinyl alcohol monofilament has the greatest characteristics. Moreover, extent of said lowering was found to be increased in proportion to number of carbon atoms of the higher alcohol residual group, which showed that the terminal hydrocarbon portion came out on the surface of the fiber.

From many examples, the present inventors have learned that in the fiber according to the present invention, extent of lowering of friction coefficient brought about by the block PVA was generally proportional to the improved effect of various other modified properties. Accordingly, the fibers having small friction coefficients such as those in this example were understood to be simultaneously improved in other various properties. As shown in Table 3, that the fibers were small in extent of fluffs (effect of treatment with an oiling agent) was one of the characteristics. An inclination that ratio of wet knot strength to the tensile strength advanced was observed.

EXAMPLE 10

Similar to Example 7, PVA containing 83% by weight of cetyl alcohol-block-PVA (polymerization degree: about 700) was prepared, 3% of which was mixed with a commercially available polyvinyl alcohol to prepare a 42% aqueous solution. By spinning said solution into the air at 80° C. and drawing, a filament having a draw ratio of 10 times was obtained. When the efficiency of strength and wet abrasion tenacity of this filament were compared with those of a control filament, the former rose by 10% and the latter reached 2.3 times, from which it was understood that the conventional dry-spun filament was improved.

What is claimed is:

1. A polyvinyl alcohol composition consisting of 0.1–80% by weight of polyvinyl alcohol having a polymerization degree of at least 150 but below 3000, a saponification degree of at least 95 mol percent and as a terminal group at one end a group selected from the class consisting of

and

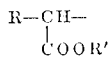

wherein R is a saturated aliphatic hydrocarbon group having 5–29 carbon atoms, and R' is selected from the class consisting of hydrogen, an alkyl group having 1–3 carbon atoms, sodium and potassium, and 99.9—20% by weight of normal polyvinyl alcohol having absent said terminal group and having a saponification degree of at least 95 mol percent.

2. A polyvinyl alcohol composition of claim 1 wherein said terminal group is

wherein R is a saturated aliphatic hydrocarbon having 9–23 carbon atoms.

3. A polyvinyl alcohol composition of claim 2 wherein said terminal group is lauryl alcohol residual group.

4. A polyvinyl alcohol composition of claim 2 wherein said terminal group is stearyl alcohol residual group.

5. A polyvinyl alcohol composition of claim 1 wherein said terminal group is $$R-\underset{\underset{\text{COOH}}{|}}{CH}-$$

wherein R is a saturated aliphatic hydrocarbon group having 9–23 carbon atoms.

6. A polyvinyl alcohol composition of claim 5 wherein said terminal group is stearic acid residual group.

7. A shaped article consisting of 0.1–80% by weight of polyvinyl alcohol having a polymerization degree of at least 150 but below 3000, a saponification degree of at least 95 mol percent and at one end a group selected from the class consisting of

and

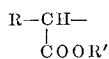

wherein R is a saturated aliphatic hydrocarbon group having 5–29 carbon atoms, and R' is selected from the class consisting of hydrogen, an alkyl group having 1–3 carbon atoms, sodium and potassium, is bounded and 99.9–20% by weight of normal polyvinyl alcohol having absent said terminal group and having a saponification degree of at least 95 mol percent.

References Cited

UNITED STATES PATENTS

| | | | |
|---|---|---|---|
| 2,668,809 | 2/1954 | Bryant et al. | 260—91.3 |
| 2,882,161 | 4/1959 | Dann et al. | 260—91.3X |
| 3,251,795 | 5/1966 | Fukushima et al. | 260—91.3X |
| 3,397,162 | 8/1968 | Takigawa et al. | 260—91.3X |

FOREIGN PATENTS

| | | | |
|---|---|---|---|
| 588,023 | 12/1959 | Canada | 260—91.3 |
| 922,458 | 4/1963 | Great Britain | 260—874 |

SAMUEL H. BLECH, Primary Examiner

H. ROBERTS, Assistant Examiner

U.S. Cl. X.R.

117—161; 260—23, 29.6, 78, 79.5, 80.3, 85.7, 91.3; 264—185, 205

UNITED STATES PATENT OFFICE
CERTIFICATE OF CORRECTION

Patent No. 3,557,250      Dated January 19, 1971

Inventor(s) Kiyokazu Imai et al

It is certified that error appears in the above-identified patent and that said Letters Patent are hereby corrected as shown below:

Claim 7, fourth line from the bottom change "bounded" to "bonded".

Signed and sealed this 30th day of March 1971.

(SEAL)
Attest:

EDWARD M. FLETCHER, JR.
Attesting Officer

WILLIAM E. SCHUYLER,
Commissioner of Paten